United States Patent
Gerhold et al.

(10) Patent No.: US 10,536,026 B2
(45) Date of Patent: Jan. 14, 2020

(54) COMPACT PASSENGER STATION STRUCTURE CONTAINING VEHICLE CHARGING COMPONENTS

(71) Applicant: Toshiba International Corporation, Houston, TX (US)

(72) Inventors: Richard Robert Gerhold, Cypress, TX (US); Mark Douglas Rayner, Houston, TX (US)

(73) Assignee: Toshiba International Corporation, Houston, TX (US)

(*) Notice: Subject to any disclaimer, the term of this patent is extended or adjusted under 35 U.S.C. 154(b) by 556 days.

(21) Appl. No.: 14/812,581

(22) Filed: Jul. 29, 2015

(65) Prior Publication Data
US 2017/0028864 A1    Feb. 2, 2017

(51) Int. Cl.
*B60L 11/18* (2006.01)
*H02J 7/35* (2006.01)

(52) U.S. Cl.
CPC ..................................... *H02J 7/35* (2013.01)

(58) Field of Classification Search
CPC ..... B60L 11/1838; B60L 11/1816; H02J 7/35; Y02T 90/14; Y02T 90/128; Y02T 90/163; Y02T 10/7005; Y02T 10/7088
USPC .......................................................... 320/109
See application file for complete search history.

(56) References Cited

U.S. PATENT DOCUMENTS

| | | | |
|---|---|---|---|
| 5,107,637 A | 4/1992 | Robbins | |
| 5,847,537 A * | 12/1998 | Parmley, Sr. | ........... B60L 8/003 320/109 |
| 8,375,655 B1 | 2/2013 | Welschholz | |
| 9,260,025 B1 * | 2/2016 | McGrath | ............. B60L 11/1816 |
| 2002/0096412 A1 * | 7/2002 | Batisse | ..................... B60L 9/18 191/22 R |

(Continued)

FOREIGN PATENT DOCUMENTS

CN    202004477 U    * 10/2011
CN    202004477 U    * 10/2011

(Continued)

OTHER PUBLICATIONS

International Search Report and Written Opinion issued in related Application No. PCT/US2016/042192, dated Oct. 5, 2016 (9 pages).

(Continued)

*Primary Examiner* — Richard Isla
*Assistant Examiner* — Mohammed J Sharief
(74) *Attorney, Agent, or Firm* — Baker Botts L.L.P.

(57) ABSTRACT

Present embodiments of the disclosure are directed to a zero-footprint charging station for use with vehicles having quick-charge batteries. The disclosed embodiments enable the "quick-charge" power conversion equipment to disappear entirely into a passenger station structure. The passenger station structure may include a structural component of a bus stop (or other vehicle station) that is designed to accommodate passengers waiting to board the bus (or other transportation vehicle). By housing the power conversion electronics within a larger structure that serves a purpose at the vehicle station, the system may enable larger amounts of power electronics to be incorporated into a relatively strong and stable structure conforming to a desired size for the area (e.g., bus stop).

17 Claims, 2 Drawing Sheets

(56) References Cited

U.S. PATENT DOCUMENTS

| | | | | |
|---|---|---|---|---|
| 2010/0000596 A1* | 1/2010 | Mackler | ............... | G09F 11/025 |
| | | | | 136/246 |
| 2010/0156356 A1* | 6/2010 | Asakura | ............... | H01M 10/44 |
| | | | | 320/148 |
| 2011/0066515 A1* | 3/2011 | Horvath | ............... | G06Q 20/204 |
| | | | | 705/17 |
| 2011/0074351 A1* | 3/2011 | Bianco | ............... | B60L 11/1816 |
| | | | | 320/109 |
| 2011/0187310 A1* | 8/2011 | Gochenaur | ........... | H01M 10/46 |
| | | | | 320/101 |
| 2013/0033222 A1* | 2/2013 | Hixson | ............... | E04H 1/1211 |
| | | | | 320/101 |
| 2013/0193918 A1 | 8/2013 | Sarkar et al. | | |
| 2014/0080406 A1* | 3/2014 | Freitas | ............... | H02J 9/061 |
| | | | | 455/7 |
| 2014/0160280 A1* | 6/2014 | Rodr guez | ............. | H04N 7/188 |
| | | | | 348/143 |
| 2014/0167694 A1* | 6/2014 | Gjinali | ............... | B60L 11/1824 |
| | | | | 320/109 |
| 2014/0340040 A1 | 11/2014 | Hill et al. | | |

FOREIGN PATENT DOCUMENTS

| | | | | |
|---|---|---|---|---|
| DE | 102013112845 A1 * | 5/2013 | | |
| DE | 102013112845 A1 * | 5/2015 | .......... | B60L 11/1824 |

OTHER PUBLICATIONS

International Preliminary Report on Patentability issued in related Application No. PCT/US2016/042192, dated Feb. 8, 2018 (8 pages).

* cited by examiner

COMPACT PASSENGER STATION STRUCTURE CONTAINING VEHICLE CHARGING COMPONENTS

TECHNICAL FIELD

Embodiments of the present disclosure relate generally to vehicle charge stations, and more specifically, to a zero-footprint charging station for vehicles equipped with "quick-charge" batteries.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Vehicles that utilize rechargeable batteries to provide partial or full motive power to the vehicle are being used increasingly in various fields, such as public transportation. Some existing battery systems may feature battery chemistries that allow for quick-charging the battery. This means that the battery can be charged in a matter of a few minutes, as opposed to other batteries that typically require overnight charging. Vehicles equipped with such quick-charge batteries can be stopped and recharged throughout the day between transporting passengers along a route.

Quick-charge battery systems generally rely on large charging components that include high power conversion equipment. These charging components are typically housed in large industrial cabinets that occupy a considerable amount of space at positions along the route of the vehicle. Unfortunately, charging components disposed in these industrial cabinets have several drawbacks, such as poor aesthetics and an undesirable footprint in space-tight urban environments.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
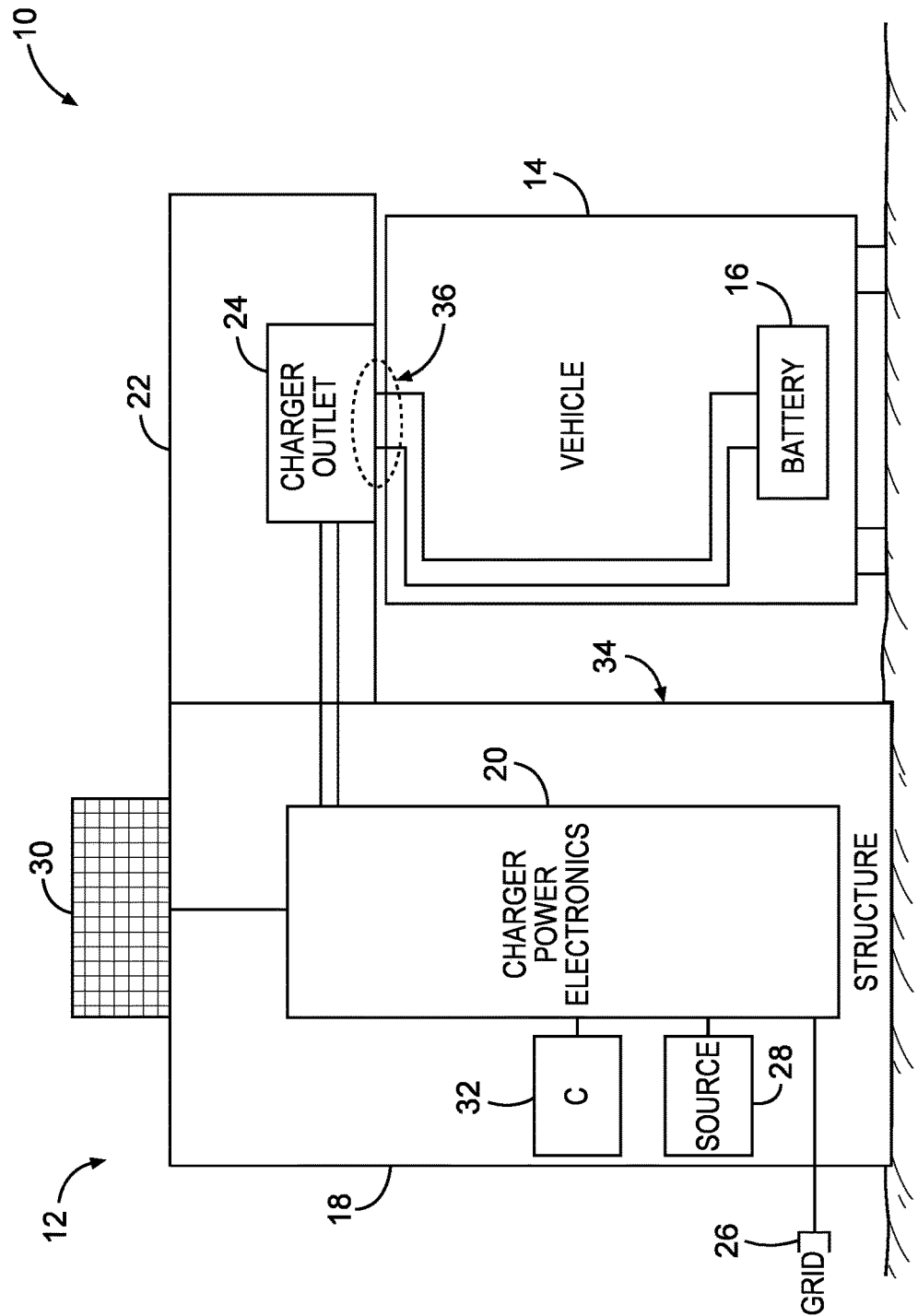
FIG. 1 is a schematic block diagram illustrating a vehicle charging station used to perform a "quick-charge" on a battery operated vehicle, in accordance with an embodiment of the present disclosure.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the disclosure are directed to a zero-footprint charging station for use with vehicles having quick-charge batteries. The vehicles may include public transportation vehicles, such as buses, school buses, ferries, light rails, and rapid transit vehicles. Quick-charge batteries may include certain chemistries (e.g., lithium titanate) that allow the batteries to be charged in a short amount of time (e.g., within minutes or less than an hour). The quick-charge batteries could feature any desired battery chemistry that is currently available or that may be later developed and introduced into the field of battery power sources. In addition, the terms "quick-charge battery" and "vehicle battery" used herein should not be limited to traditional battery-type power sources, but may also include ultra-capacitors and other charge carrying power sources that may be adapted for use in vehicles.

The disclosed systems may utilize a relatively large amount of power conversion electronics to control conversion of incoming power to the relatively high charging power needed to quick-charge the batteries. These power conversion electronics may take up a large amount of space compared to charging equipment used to charge a vehicle battery overnight. The large power conversion electronics are typically positioned in standalone units near a transportation vehicle station, such as a bus stop. Such transportation vehicle stations are generally positioned in crowded urban locations. Unfortunately, in these spaces the power conversion equipment can take up an undesirable amount of space and obstruct views.

To address these drawbacks, the disclosed embodiments enable the "quick-charge" power conversion equipment to disappear entirely or even partially into a passenger station structure. The passenger station structure may include a structural component of a bus stop (or other vehicle station) that is designed to accommodate passengers waiting to board the bus (or other transportation vehicle). For example, the passenger station structure may include benches for allowing passengers to sit while waiting for the vehicle, or may be used to support a roof or overhang to shield passengers from sun, rain, and other elements. By housing the power conversion electronics within a larger structure that serves a purpose at the vehicle station, the system may enable larger amounts of power electronics to be incorporated into a relatively strong and stable structure conforming to a desired size for the area (e.g., bus stop). Since the power conversion electronics are built into a structure used by the passengers, there is no need for a standalone unit that would otherwise take up additional space and possibly become vandalized. Thus, the disclosed systems and methods offer a more aesthetic, compact, and space-saving containment for quick-charge power conversion electronics.

Turning now to the drawings, FIG. 1 illustrates a transportation system 10 featuring a transportation vehicle station 12 and a transportation vehicle 14 with a "quick-charge" vehicle battery 16. The station 12 may include a passenger station structure 18 for containing quick-charge power conversion electronics 20. In the illustrated embodiment, the station 12 also may include a roof 22 extending outward from the station structure 18, as well as a charger outlet 24 communicatively coupled to the power electronics 20 to provide the desired charge to the battery 16.

The term "quick-charge" used herein refers to a battery/charger arrangement that enable the battery 16 to be fully charged in less than approximately 10 minutes. More specifically, the quick-charge system may be used to charge the battery 16 in approximately 2 to 5 minutes after hooking the battery 16 up to the charger outlet 24. In some embodiments, the battery 16 may include a specific battery chemistry that charges faster than other chemistries to facilitate the quick-charge. For example, the battery 16 may include a Toshiba SCiB battery made with a lithium titanate battery chemistry. It should be noted that other types of batteries 16 may be used in other embodiments. In addition, the power electronics 20 used to charge the battery 16 may be particularly equipped to charge the quick-charge battery 16 in a relatively short amount of time.

In order to accommodate the high levels of charging power being output from the system, the station 12 may include a large amount of power electronics 20 for converting incoming power to charging power to charge the battery 16. The power electronics 20 may include any desirable number and arrangement of inverters, rectifiers, transistors, fuses, and various switching components for providing the desired power conversion. As schematically illustrated, the power electronics 20 may take up a considerable amount of space within the passenger station structure 18. Indeed, the equipment cabinetry holding the power electronics 20 is built directly into and forms part of the vehicle station 12.

In addition to the power electronics 20 housed in the structure 18, the station 12 may also be equipped with one or more power sources used to provide initial power for the power electronics 20 to convert to charging power. These one or more power sources may include, for example, a grid power connection 26 for electrically coupling the power conversion electronics 20 to the power grid. In some embodiments, the power source may include an onboard power source 28, such as a battery, disposed within the structure 18 along with the power electronics 20. In still other embodiments, the power source may include one or more solar cells or panels 30 disposed on the structure 18 (or the roof 22) to convert solar energy to electrical energy for the power electronics 20. In some embodiments, the power conversion electronics 20 may include a switching circuit that enables the power electronics to selectively switch between the different power sources (e.g., grid, battery, or solar cells).

In the illustrated embodiment, the station 12 may also include a controller 32 for controlling operation of the power electronics 20 housed within the structure 18. As illustrated, the controller 32 may be housed within the structure 18 along with the power electronics 20. The controller 32 may include a processor and a memory for controlling the power electronics 20. It should be noted that the term "controller 32" in the present disclosure may refer to one or more controllers having a processor and/or memory that are communicatively coupled to each other to perform the desired control tasks. Under processor control, the power electronics 20 may convert the incoming power from the one or more power sources to charging power for output to the charger outlet 24, in order to charge the vehicle battery 16.

The power electronics 20 may be controlled to deliver the charging power to the charger outlet 24 once the vehicle 14 is positioned in close proximity to the charger outlet 24. The charger outlet 24 (i.e., connection from the battery 16 to the power electronics 20) may be arranged in several different ways. In some embodiments, the charger outlet 24 may be physically part of or an extension of the passenger station structure 18. For example, the charger outlet 24 may be disposed along the roof 22 so that it is positioned directly above the vehicle 14 when the vehicle 14 is parked near the station 12, as shown. In other embodiments, the charger outlet 24 may be positioned along and extend from another surface (e.g., side 34) of the structure 18. The charger outlet 24 may be a connection made at ground, or in some cases below grade, or it may include a traditional cable and plug connection. In still other embodiments, the charger outlet 24 may be disposed in other positions relative to the structure 18 and to the vehicle 14, in order to interface with the vehicle battery 16. For example, the charger outlet 24 may in some cases be physically separate from the structure 18. Any desirable type of charger outlet that is currently available or that may be later developed and introduced into the field of charging connectors may be used with the disclosed vehicle charging station 12.

It should be noted that the position of the vehicle battery 16 in the vehicle 14 does not have to be proximate the charger outlet 24 to enable charging. As shown, the vehicle 14 may include leads for directing incoming power from a connection interface 36 between the vehicle 14 and the charger outlet 24 to the vehicle battery 16. That way, the vehicle battery 16 may be positioned at any desirable location within the vehicle 14 (e.g., near the bottom) while still being able to receive charging power from the power electronics 20 via the charger outlet 24. At the connection interface 36, the vehicle 14 and/or the charger outlet 24 may include leads positioned toward each other to form the connection needed to quick-charge the battery 16 via the charging power output from the power electronics 20.

To charge the battery 16, the vehicle 14 may move into position proximate the charger outlet 24 (e.g., under the roof 22) such that the connection interface 36 can be formed at the charger outlet 24. The system 10 may automatically, or with the help of an operator, connect the leads of the battery 16 to the charger outlet 24. From here the controller 32 may control the power electronics 20 to receive incoming power from one or more power sources, convert the incoming power into a pre-determined charging power, and deliver the charging power to the charger outlet 24. From here the charger outlet 24 may output the charging power to the battery 16 to increase the charge stored in the battery 16. This charging process may take a relatively short amount of time, since it involves quick-charging the battery 16. For example, the charging process may last less than approximately an hour, less than approximately 20 minutes, less than approximately 10 minutes, between approximately 3 to 5 minutes, or between approximately 2 to 3 minutes. The exact length of time of charging may vary based on the size of the battery 16 and/or the chemistry of the battery 16. After the quick-charge is complete, the charging sequence through the power electronics 20 may be ended, the vehicle battery 16 may be separated from the charger outlet 24, and the vehicle 14 may move on to transport passengers to another stop along its route.

The above described quick-charge process may be performed while the vehicle 14 is waiting to begin its route, or during a stop in the middle of the route. The charging may generally be performed while passengers are unloading/loading from the vehicle at the station 12. The fully charged vehicle battery 16 may provide enough motive power to operate the vehicle 14 for a certain amount of time and/or distance traveled by the vehicle 14. During this operation, the vehicle 14 may stop at several other stations along the route that are not equipped with charging equipment. When it is time for the battery 16 to be recharged, an operator may direct the vehicle 14 to the nearest charging station 12.

Several vehicles 14 having rechargeable batteries 16 may utilize the same station 12 to recharge their batteries 16. These vehicles 14 may be run on the same general route spaced apart at different times, or they may be run on different routes entirely. The vehicles 14 may be scheduled to take turns recharging their batteries 16 at the station 12.

In the illustrated embodiment, the vehicle 14 may be a bus used for public transportation, and the station 12 may be a bus station or a bus stop. However, the disclosed system 10 is not limited to public bus transportation applications. In other embodiments of the system 10, the vehicle 14 may include a school bus, a light rail train, a rapid transit vehicle (e.g., bullet train), a ferry, or any other desirable vehicles used to transport passengers from the station 12. Similarly, the station 12 may include a school bus stop, a light rail station, a rapid transit station, a ferry weigh station, or some other station 12 used to accommodate passengers waiting for a vehicle 14. Indeed, the disclosed system 10 may be applied under any circumstances where the appearance of larger power electronics products is aesthetically unattractive.

Figure 2:
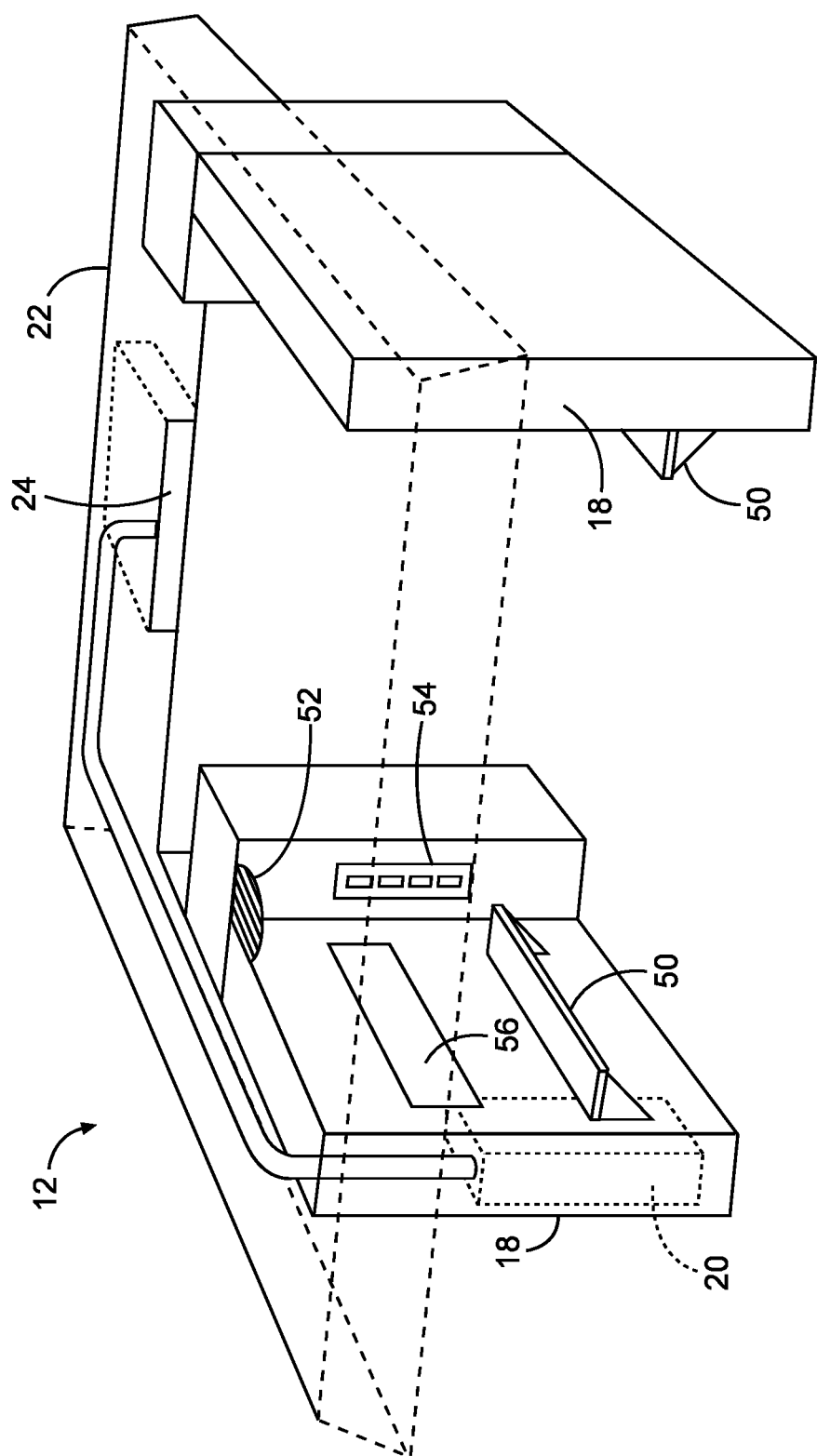
FIG. 2 is a partial perspective view of a vehicle charging station for housing quick-charge power electronics, in accordance with an embodiment of the present disclosure.

FIG. 2 illustrates a more detailed view of an embodiment of the station 12 used to house the power electronics 20. In the illustrated embodiment, the station 12 may include a bus station shelter or bus stop shelter where passengers can wait for a bus. The illustrated station 12 is designed to house the power conversion electronic equipment 20 in one or more structures 18 (e.g., enclosures) that also serve as structural members of the bus stop shelter 12.

In the illustrated embodiment, the bus stop shelter 12 may include, among other things, the roof 22 extending between the two structures 18, the charger electronics 20 housed in one or both of the shelter structures 18, and a docking structure or charger outlet 24 where the vehicle battery of the bus may be hooked up to receive the charging power from the charger power electronics 20. In addition to these features, the illustrated bus stop shelter 12 may include a number of passenger interface components that may be used to collect or provide information, electrical power, and structural support for the passengers waiting at the shelter 12. For example, the bus shelter 12 may be equipped with benches 50 or other seating for supporting the passengers, one or more lights, security cameras 52, consumer electronics charging outlets (e.g., cell phone charge ports) 54, signage and other information displays 56 for conveying information to passengers, emergency signaling components, or a combination thereof. Other types of passenger interface components may be provided in other embodiments of the shelter 12. These features may make the shelter structures 18 more aesthetically pleasing to passengers, in addition to integrating various components that provide value to the passengers waiting at the shelter 12.

In some embodiments, the passenger interface components that operate using electrical energy (e.g., lights, signage, displays, electronic device chargers, etc.) may be electrically coupled to the power electronics 20 within the structure 18. In addition, the electrical passenger interface components may be communicatively coupled to the controller (i.e., 32 from FIG. 1) used to provide processor control to the power electronics 20. In such instances, the power electronics 20 may be controlled to selectively output power to the one or more electrical passenger interface components.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

What is claimed is:

1. A system, comprising:
    a passenger station structure comprising a structural component of a bus station, a light rail station, a school bus stop, a bus stop, a rapid transit station, or a ferry weigh station, wherein the structural component is configured for accommodating passengers awaiting a transportation vehicle, wherein the structural component comprises:
        a first structure having walls that define a rectangular enclosure, wherein two walls of the first structure extend in parallel planes along a length of the passenger station structure;
        a bench mounted directly to one of the two walls for supporting passengers;
        a second structure spaced apart from the first structure; and
        a roof disposed on and spanning a space between the first structure and the second structure, wherein the roof forms a canopy under which the entire transportation vehicle passes between the first and second structures;
    power conversion electronics built into the passenger station structure to convert incoming power from a power source to charging power for charging a battery in the transportation vehicle, wherein cabinetry holding the power conversion electronics is housed within the enclosure of the first structure of the structural component; and
    a charger outlet disposed proximate the passenger station structure and communicatively coupled to the power conversion electronics to transmit the charging power from the power conversion electronics to the battery in the transportation vehicle, wherein the charger outlet is disposed along the roof such that the charger outlet is positioned directly above the transportation vehicle when the transportation vehicle is parked at the passenger station structure.

2. The system of claim 1, wherein the power conversion electronics and the cabinetry holding the power conversion electronics are hidden entirely from view within the passenger station structure and form a part of the passenger station structure used by passengers awaiting the transportation vehicle.

3. The system of claim 1, wherein the charger outlet extends from a surface of the passenger station structure.

4. The system of claim 1, wherein the power source comprises a power grid connection disposed on the passenger station structure for coupling the power conversion electronics to a power grid, a solar panel disposed on the passenger station structure, a battery disposed in the passenger station structure with the power conversion electronics, or a combination thereof.

5. The system of claim 1, further comprising a controller comprising a processor and memory disposed in the passenger station structure and communicatively coupled to each other and the power conversion electronics to control the power conversion electronics to output the charging power.

6. The system of claim 1, wherein the passenger station structure comprises one or more passenger interface components.

7. The system of claim 6, wherein the passenger interface components comprise one or more signs for conveying information to passengers, charge ports for passengers to charge electronic devices, security cameras, lights, emergency signaling components, or a combination thereof.

8. The system of claim 6, wherein the passenger interface components are communicatively coupled to the power conversion electronics such that the power conversion electronics are configured to power the passenger interface components.

9. The system of claim 8, further comprising a controller disposed in the passenger station structure and communicatively coupled to the power conversion electronics and the passenger interface components to control the power conversion electronics to output the charging power and to control the passenger interface components.

10. The system of claim 1, wherein the power conversion electronics and the charger outlet are configured to charge the battery of the transportation vehicle in approximately 2 to 5 minutes.

11. The system of claim 1, wherein the power source comprises a plurality of different power sources, and wherein the power conversion electronics comprise a switching circuit that enables the power conversion electronics to selectively switch between the different power sources.

12. A system, comprising:
a transportation vehicle comprising a battery for providing at least partial motive power to the transportation vehicle, wherein the transportation vehicle comprises a bus, a light rail, a school bus, a rapid transit vehicle, or a ferry; and
a transportation vehicle station for receiving the transportation vehicle, comprising:
a passenger station structure comprising a structural component of a bus station, a light rail station, a school bus stop, a bus stop, a rapid transit station, or a ferry weigh station, wherein the structural component is configured for accommodating passengers awaiting the transportation vehicle, wherein the structural component comprises:
 a first structure having walls that define a rectangular enclosure, wherein two walls of the first structure extend in parallel planes along a length of the passenger station structure;
 a bench mounted directly to one of the two walls for supporting passengers;
 a second structure spaced apart from the first structure; and
 a roof disposed on and spanning a space between the first structure and the second structure, wherein the roof forms a canopy under which the entire transportation vehicle passes between the first and second structures;
power conversion electronics built into the passenger station structure to convert incoming power from a power source to charging power for charging the battery, wherein cabinetry holding the power conversion electronics is housed within the enclosure of the first structure of the structural component; and
a charger outlet disposed proximate the passenger station structure and communicatively coupled to the power conversion electronics to transmit the charging power from the power conversion electronics to the battery, wherein the charger outlet is disposed along the roof such that the charger outlet is positioned directly above the transportation vehicle when the transportation vehicle is parked at the passenger station structure.

13. The system of claim 12, wherein the power conversion electronics and the cabinetry holding the power conversion electronics are hidden entirely from view within the passenger station structure and form a part of the passenger station structure used by passengers awaiting the transportation vehicle.

14. A method, comprising:
controlling power conversion electronics built into a passenger station structure of a transportation vehicle station, the passenger station structure comprising a structural component of a bus station, a light rail station, a school bus stop, a bus stop, a rapid transit station, or a ferry weigh station and being configured to accommodate passengers awaiting a transportation vehicle, wherein the structural component comprises:
 a first structure having walls that define a rectangular enclosure, wherein two walls of the first structure extend in parallel planes along a length of the passenger station structure;
 a bench mounted directly to one of the two walls for supporting passengers;
 a second structure spaced apart from the first structure; and
 a roof disposed on and spanning a space between the first structure and the second structure, wherein the roof forms a canopy under which the entire transportation vehicle passes between the first and second structures, wherein cabinetry holding the power conversion electronics is housed within the enclosure of the first structure of the structural component;
converting incoming power from a power source to charging power for charging a vehicle battery of the transportation vehicle via the power conversion electronics; and
outputting the charging power from the power conversion electronics to the vehicle battery via a charger outlet, wherein the charger outlet disposed proximate the passenger structure along the roof such that the charger outlet is positioned directly above the transportation vehicle when the transportation vehicle is parked at the passenger station structure.

15. The method of claim 14, further comprising delivering the incoming power to the power conversion electronics from a grid power source, a solar power source, or a battery power source.

16. The method of claim 14, further comprising providing power from the power conversion electronics for operating one or more passenger interface components disposed on the passenger station structure.

17. The method of claim 14, further comprising hiding the power conversion electronics at least partially from view within the passenger station structure while enabling passengers to utilize the passenger station structure.

* * * * *